Figure 1:
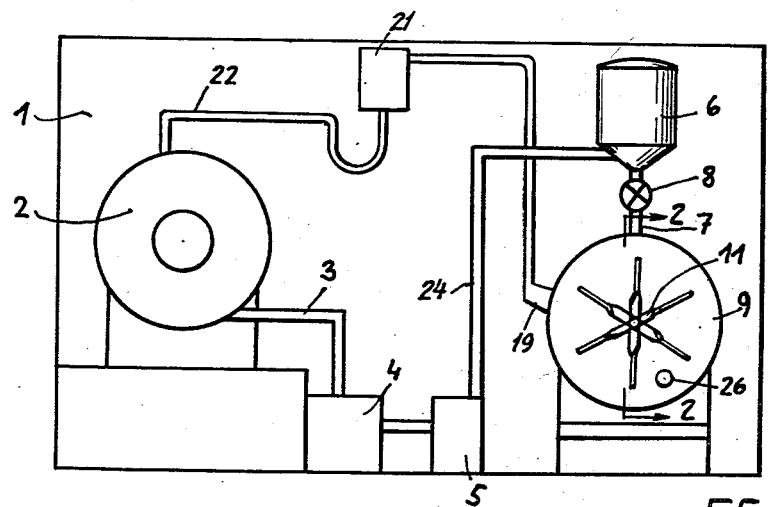

Feb. 16, 1965  H. FÜHRING  3,169,537
CHEMICAL CLEANING DRUM AND DISTILLER TANK THEREFOR
Filed Oct. 25, 1962

INVENTOR.
HEINRICH FÜHRING
BY
ATTORNEY

United States Patent Office 3,169,537
Patented Feb. 16, 1965

3,169,537
CHEMICAL CLEANING DRUM AND
DISTILLER TANK THEREFOR
Heinrich Führing, Augsburg, Germany, assignor to Max Bohler and Ferdinand Weber, Augsburg, Germany
Filed Oct. 25, 1962, Ser. No. 233,102
7 Claims. (Cl. 134—111)

The invention relates to a chemical cleaning machine and distiller tank therefor, in which the sludge from the filter is freed from its residual content of solvent.

In the chemical cleaning machines normally used, a vertical distiller tank underneath one or two filters is employed, which is connected by pipes to the filter tanks. A great many of the distiller tanks known hitherto are used in conjunction with grids, filters or other devices serving to retain the sludge. Usually, the solvent-impregnated sludge is heated in the distiller tank and brought to evaporation temperature. The sludge that is left still contains residual solvent, which cannot be readily recovered. With the object of recovering these residues as well, one known method employed is to lead the sludge away to so-called sludge filters, in which it is treated with a direct supply of steam. The disadvantages of this way of dealing with the problem is the heavy cost of construction and the amount of labor needed for operation and maintenance. The invention therefore aims at reducing construction costs, while still enabling the residues of solvent to be recovered from the sludge.

It was found that a special sludge filter could be dispensed with and increased efficiency could nevertheless be achieved if, according to the invention, the distiller tank was disposed horizontally and had agitator gear fitted inside.

In the initial stage, evaporation can proceed, as usual, with indirect heating of the solvent, without the agitator needing to be brought into play. As soon as condensation of the evaporated solvent falls, the sludge collecting in the tank is stirred with the agitator gear while being further heated, which gives rise to further evaporation of the residual solvent, because the agitator continually causes fresh surfaces of sludge to be exposed. Live steam should preferably be admitted to the distiller tank, to promote this further evaporation.

The agitator equipment envisaged by the invention may with advantage consist of a number of scoop-shaped paddles set radially on, and distributed over the length of, a shaft fitted axially, with its axis parallel. This arrangement leaves enough room in the distiller tank to accommodate the sludge, while at the same time ensuring that all parts can be reached by the paddles.

There is particular advantage in having the agitator components set askew, so as to act like a worm conveyor. In this way, the distiller tank can be designed to be self-emptying, thanks to the action of the agitator components. It is then advisable to have the discharge door at the end towards which the sludge is carried by the paddles. To avoid any tendency of the sludge to heap up at one end of the tank while it is being agitated, the invention provides for the agitator gear to be driven backwards and forwards—manually, for example, or by means of reversing gear. While the agitator gear is rotating, the direction of rotation of its shaft is repeatedly changed, so that the sludge is both opened up by the agitator paddles and moved to and fro. It is this loosening action which has enabled the maximum amount of residual solvent to be recovered.

A further feature of the invention provides for the agitator shaft to be fitted off-centre, below the centre line of the tank. This arrangement is advantageous where the dome of the distiller tank is close to the agitator paddles. The farther the agitator paddles from the dome—and this spacing is increased by the off-centre arrangement—the fewer the blockages of the dome when the agitator is in operation.

Finally, to avoid uneven opposition to the rotation of the agitator gear, it is advisable to stagger the agitator paddles round the periphery. The scoop-shaped members of the agitator paddles may with advantage be disposed to lie approximately in a helix round the agitator shaft.

Figures 2, 3:
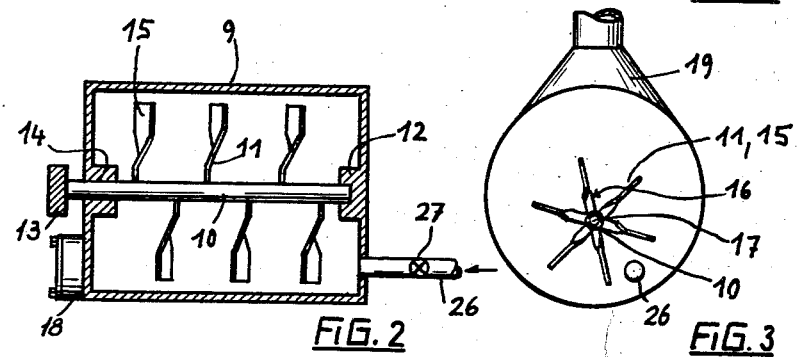

The invention is diagrammatically illustrated by way of example in the accompanying drawings, in which:

FIGURE 1 is a side elevation of a cleaning machine;
FIGURE 2 is a longitudinal section through a distiller tank, taken along the line 2—2 of FIGURE 1;
FIGURE 3 is a front view of a distiller tank, and
FIGURE 4 is a side elevation of the distiller tank, showing the distribution of the agitator paddles.

In the construction illustrated by way of example in FIGURE 1, 1 and 2 are representations of the cleaning machine as a whole, and of its cleaning drum, respectively. The solvent passes from the drum through pipe 3 and pin trap 4 to pump 5, which conveys the solvent under pressure, to the lower part of a filter 6. As a rule, pin trap 4 is provided with a charge of filter powder, a property of which is that it settles in the interstices of the filter elements in filter 6, and in so doing causes the impurities suspended in the solvent to settle. In due course, a layer of dirt accumulates on the filter elements and this falls to the bottom of filter tank 6 in the form of sludge and is removed from time to time, or is removed mechanically. The sludge can then be run off, with a certain amount of the solvent, through pipe 7, which is normally closed by a cock 8, into distiller tank 9. As FIGURE 1 shows, distiller tank 9 is disposed horizontally below filter tank 6. Inside distiller tank 9 is agitator gear 11 in the form of paddle wheels carried on shaft 10.

In one construction of agitator gear 11, illustrated by way of example in FIGURE 2, it will be seen that driving shaft 10 passes more or less axially through horizontal tank 9, the paddles 11 being distributed along the entire length of shaft 10. The ends of paddles 11 are turned or are fitted with scoop-shaped members 15, so as to produce a kind of shovelling action when paddles 11 pass through the sludge. Driving shaft 10, as in the example illustrated, can have one end closed off in an end bearing 12, and the other centred axially in another bearing 14. At the open end of shaft 10 is a hand crank or driving wheel 13 of suitable construction which is operated maanually or by gearing (not shown). The turned ends or scoop-shaped members 15 should preferably be so provided that together they produce a worm-conveyor effect. Thus, as agitator gear 11 rotates, the sludge (not shown) in tank 9 is moved towards one end thereof. To keep this movement going or to reverse it, it is advisable to turn the shaft constantly backwards and forwards or to fit reversing gear that will continually alter the direction of rotation of agitator-driving-shaft 10. In this way, as paddles 11/15 pass through the sludge, this is not only opened up, but is also moved axially to and fro. This ensures that every scrap of the sludge is brought to the top, so that the solvent it contains can evaporate or volatilise.

Figure 4:
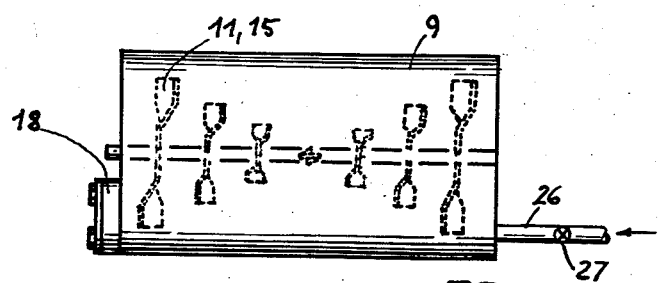

As shown in FIGURE 4, there is a discharging door 18, at one end of distiller tank 9. It is best for this to be fitted at the end towards which agitators 11/15 predominantly tend to convey the sludge.

Paddles 11 are distributed not only along, but also round shaft 10, so as to avoid as far as possible the setting-up of torque fluctuations when agitator shaft 10 is turning. Paddles 11 may be fitted to project on one side only and may be so distributed that their free ends or scoops 15 lie in a helix round shaft 10. Again, as FIGURE 4 shows, two or more paddles 11 can be fitted at the same position in the length of shaft 10.

FIGURE 3 has been added to illustrate the point that it is advisable in many cases for agitator shaft 10 to be fitted with its axis off-centre in tank 9. In the present example, 19 represents the dome of distiller tank 9. In this construction, which is given by way of example only, axis 17 lies eccentrically below the central axis 16 of the tank, in order to keep scoops 15 of paddles 11 as far away as possible from dome 19 as they rotate. Without this disposition some of the sludge might well heap up as the agitator gear revolved and cause blockages in dome 19.

It is left to the skilled worker to decide how distiller tank 9 should be heated. It can be heated, for example, by a steam or electrically heated jacket; the only requirement is that the sludge shall be heated in one way or another; but it is better if live stem can be admitted to the sludge during or after the agitation. To this end, the distiller tank 9 is provided with an inlet 26 for live steam, having a valve 27 of any suitable construction for the other; but it is better if live steam can be admitted to the control thereof. In this way, the evaporation of the residual solvent will be considerably assisted by the agitator paddles 11/15.

The vaporized solvent from the distiller tank 9 is led away to a condenser 21, of any suitable and conventional construction, through an outlet 19 from the tank, and by means of an outlet line 20. The condenser 21 is conventionally operable to condense the vaporized solvent to liquid form, whence it is returned to the cleaning drum 2 by means of a return line 22. This structure is exemplary only, however, it being presented merely to facilitate an understanding of the present invention. Such structure is not to be considered in a limited sense, but rather, both here in the description and in the appended claims, the broadest possible interpretation is to be attributed thereto, especially since numerous modifications are possible.

I claim:

1. In a chemical cleaning machine having a cleaning drum and a filter for the sludge and solvent, a distiller tank into which the sludge and solvent are passed from said cleaning drum and filter, with the filter positioned above said tank, pipes connecting the cleaning drum to the distiller tank, through said filter agitator gear for said sludge in said tank and driving means for forcing the sludge and solvent from said cleaning drum into said filter, the agitator gear consisting of paddles positioned on a horizontal rotatable shaft eccentrically disposed with respect to the central axis of said tank, and means for rotating said shaft.

2. In a chemical cleaning machine having a cleaning drum and a filter for the sludge and solvent, a cleaning drum, a distiller tank into which the sludge and solvent are passed from said cleaning drum and filter, the filter for the sludge and solvent positioned above said tank, pipes connecting the cleaning drum to the distiller tank, through said filter agitator gear for said sludge in said tank and pump-driving means for forcing the sludge and solvent from the cleaning drum into said filter, the agitator gear in said tank consisting of blades positioned on a horizontal rotatable shaft eccentrically disposed with respect to the central axis of said tank, the blades being bent to form scoop-shaped members for moving said sludge along said tank, and means for rotating said shaft.

3. In a chemical cleaning machine according to claim 1, including an inlet in said distiller tank for the admission of live steam.

4. In a chemical cleaning machine having a cleaning drum receiving the articles to be cleaned by means of a grease solvent, a filter for the substantial separation of sludge and solvent, a connecting duct between said drum and said filter, and means for passing such sludge and solvent under pressure to said filter, the improvement comprising a distiller tank positioned below said filter, a connecting duct between said filter and said tank, means for periodically passing sludge from said filter through said connecting duct to said tank for the further separation of solvent, and means for agitating said sludge in said tank comprising radial blades set obliquely on a shaft so as to provide a controlling effect for the sludge and solvent.

5. In a chemical cleaning machine having a cleaning drum receiving the articles to be cleaned by means of a grease solvent, a filter for the substantial separation of sludge and solvent, a connecting duct between said drum and said filter, and means for passing such sludge and solvent under pressure to said filter, the improvement comprising a distiller tank positioned below said filter, a connecting duct between said filter and said tank, means for periodically passing sludge from said filter through said connecting duct to said tank for the further separation of solvent, and means for agitating said sludge in said tank comprising paddles mounted on a rotatable shaft in said tank, in which the paddles increase in length radially from the shaft in accordance with their distance from the middle of the shaft.

6. In a chemical cleaning machine having a cleaning drum receiving the articles to be cleaned by means of a grease solvent, a filter for the substantial separation of sludge and solvent, a connecting duct between said drum and said filter, and means for passing such sludge and solvent under pressure to said filter, the improvement comprising a distiller tank positioned below said filter, a connecting duct between said filter and said tank, means for periodically passing sludge from said filter through said connecting duct to said tank for the further separation of solvent, and means for agitating said sludge in said tank, said agitator means comprising radial blades set obliquely on a shaft so as to provide a controlling effect for the sludge and solvent.

7. In a chemical cleaning machine having a cleaning drum receiving the articles to be cleaned by means of grease solvent, a filter for the substantial separation of sludge and solvent, a connecting duct between said drum and said filter, and means for passing such sludge and solvent under pressure to said filter, the improvement comprising a distiller tank poistioned below said filter, a connecting duct between said filter and said tank, means for periodically passing sludge from said filter through said connecting duct to said tank for the further separation of solvent, and means for agitating said sludge in said tank, said agitator means comprising paddles mounted on a rotatable shaft in said tank, in which the paddles increase in length radially from the shaft in accordance with their distance from the middle of the shaft.

References Cited in the file of this patent

UNITED STATES PATENTS

| | | |
|---|---|---|
| Re. 19,986 | Silver | May 26, 1936 |
| 550,035 | Wheeler | Nov. 19, 1895 |
| 847,676 | MacKethan | Mar. 19, 1907 |
| 990,862 | Jamlin | May 2, 1911 |
| 1,082,525 | Houser | Dec. 30, 1913 |
| 1,914,703 | Read | June 20, 1933 |
| 2,836,045 | Smith | May 27, 1958 |
| 2,924,557 | De Furia | Feb. 9, 1960 |